UNITED STATES PATENT OFFICE.

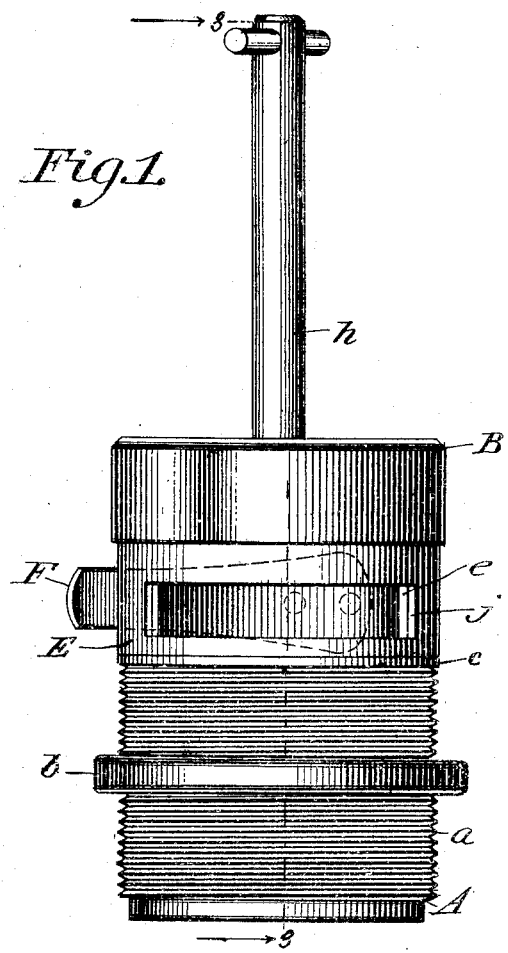
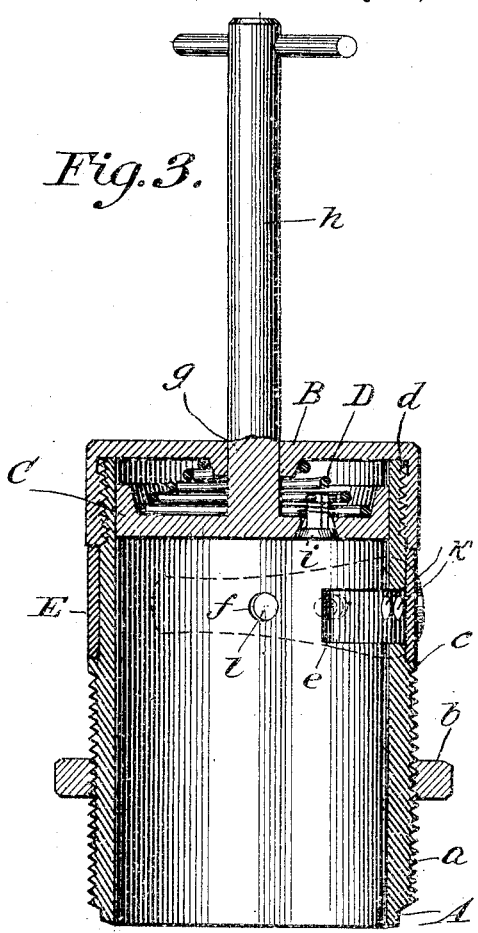
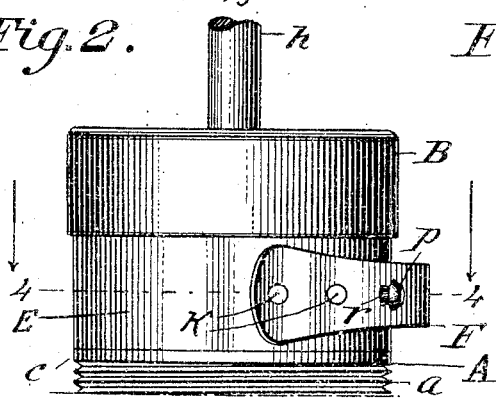
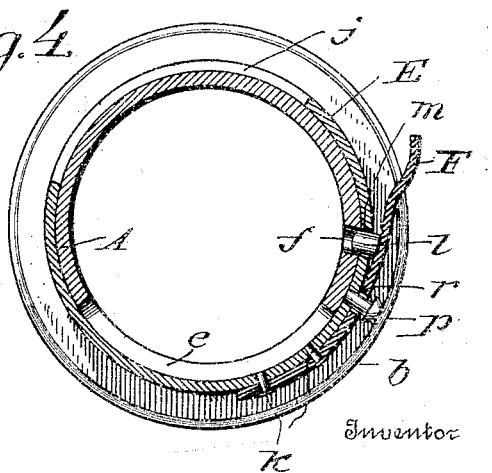

JAMES G. MATHENY, OF TERRE HAUTE, INDIANA.

GREASE-CUP.

959,023.  Specification of Letters Patent.  Patented May 24, 1910.

Application filed February 15, 1910. Serial No. 543,949.

*To all whom it may concern:*

Be it known that I, JAMES G. MATHENY, a citizen of the United States, residing at Terra Haute, in the county of Vigo and State of Indiana, have invented new and useful Improvements in Grease-Cups, of which the following is a specification.

My invention has to do with grease cups of the spring-operated follower type; and it has for its general object to provide an efficient grease cup designed more particularly for use on the main rod of an engine, and constructed with a view of being readily supplied with hard grease and of withstanding the rough usage to which devices of corresponding character are ordinarily subjected.

The invention will be best understood by reference to the following description when taken in connection with the accompanying illustration of one specific embodiment thereof, while its scope will be more particularly pointed out in the appended claims.

In the drawings which are hereby made a part hereof: Figure 1 is a side elevation showing the grease cup as open and the plunger in the position to which it is raised by hand to permit of the insertion of hard grease. Fig. 2 is a detail side elevation taken at a right angle to Fig. 1. Fig. 3 is a diametrical section taken on the line 3—3 of Fig. 1, but showing the cup as closed. Fig. 4 is a horizontal section taken on the line 4—4 of Fig. 2 and also showing the cup as closed.

Similar letters designate corresponding parts in all of the views of the drawings, referring to which:

A is the casing of my novel grease cup. The said casing is exteriorly threaded at $a$ for connection to the element by which it is to be carried, and is equipped with a jam-nut $b$ adapted to be turned against said element. The inner and outer ends of the casing are open, as shown in Fig. 3, and the casing is further provided with an exterior shoulder $c$, an exterior thread $d$ extending to its outer end, a slot $e$, and an aperture $f$ located as best shown in Fig. 4 relative to the said slot $e$. The exterior thread $d$ is for the connection of the end cap B, which is provided with a central guide aperture $g$.

In addition to the casing A, my novel grease cup comprises a follower C, a spring D, and a closure ring E. The follower is movable rectilinearly in the casing and has a chambered outer side to receive the spring which is interposed between it and the cap B and has for its office to press the follower in a direction away from the cap B. It will also be seen by reference to Fig. 3 that the follower is provided with a suitable handle $h$, and that it carries an upwardly seating spring-pressed valve $i$ the office of which is to prevent the creation of a vacuum between the follower and the body of grease such as would interfere with the raising of the follower against the action of the spring D.

The closure ring E surrounds the casing A and is interposed between the shoulder $c$ and the end cap B; and it is provided at $j$ with a slot designed to be put in registration with the slot $e$ in the casing, after the manner clearly shown in Fig. 1. It will also be observed that when the ring E is turned on the casing to the position shown in Fig. 4, the slot $e$ will be effectually closed with a view of preventing foreign substance from gaining access to the interior of the casing.

For the purpose of detachably and yet securely fastening the ring E in the closed position shown in Fig. 4, the said ring is equipped with the spring latch F which is riveted adjacent one of its ends to the ring, as indicated by $k$, is provided with a protuberance $l$ designed to work through an aperture $m$ in the ring and seat in the before-mentioned aperture $f$ of the casing, and is limited in its outward movement and held against lateral deflection by a headed pin $p$ which is fixed to the ring and is disposed in an aperture $r$ of the latch. By reference to Fig. 4 it will be readily understood that when it is desired to insert grease into the casing through the slot $e$ thereof, it is simply necessary for the operator to press the free end of the latch F radially outward to remove the protuberance $l$ from the aperture $f$, and then through the medium of the latch to move or turn the ring E on the casing until the ring slot $j$ is in registration with the slot $e$. To close the slot $e$ the operation described is reversed until the protuberance $l$ is seated in the casing aperture $f$. I would also have it here understood that when deemed expedient or desirable, the closure of the slot $e$ may be brought about by moving the ring E around the casing from the position shown in Fig. 1 to that shown in Fig. 4—that is to say, the slot e may be opened and then closed by circular movement of the ring E in one direction.

To supply my novel cup with grease, the ring E is adjusted to open the slot e, and then the follower C is pulled up above the slot e and held in said raised position by the operator, and the grease is inserted through the slot and the follower is worked up and down until the casing A is filled, whereupon the slot e is closed by adjustment of the ring E and the spring-operated follower is left to work in the ordinary well known manner.

It will be gathered from the foregoing that my novel hard grease cup is simple, compact and inexpensive in construction, is efficient in operation, and is adapted to be readily applied, and when properly applied is not liable to be pounded off or otherwise affected by the working of the engine.

Having described my invention, what I claim and desire to secure by Letters-Patent, is:

1. In a grease cup, the combination of a casing having an opening in its side and also having an aperture adjacent said opening, a follower movable in the casing, a closure ring movable around the casing and having an opening arranged in one position of the ring to register with the opening of the casing, and a spring latch fixed at one end to the ring and having its opposite end extended outward from and movable outward and inward with respect to the ring, and a protuberance carried by the movable portion of the latch and movable through the ring and into and out of the said aperture in the casing.

2. A grease cup comprising a casing open at its inner end and exteriorly threaded and having an opening in its side and an aperture adjacent said opening, a jam-nut mounted on the casing, a threaded cap closing the outer end of the casing and having a central aperture, a chambered follower movable in the casing and having a handle guided in the aperture of the cap, an upwardly seating spring-pressed valve carried by the follower, a spring surrounding the follower handle and interposed between the follower and the cap, a closure ring supported on and movable around the casing and having an opening, and a spring latch fixed at one end to the ring and having its opposite end extending outward from and movable outward and inward with respect to the ring and carrying a protuberance movable through the ring and into and out of the said aperture in the casing.

In testimony whereof I have hereunto set my hand in presence of two subscribing witnesses.

JAMES G. MATHENY.

Witnesses:
FRED. W. BEAL,
SAMUEL K. DUVALL.